March 26, 1940.  R. D. BATEMAN  2,195,354
SEMIAUTOMATIC CLUTCH
Filed March 27, 1935  2 Sheets-Sheet 1
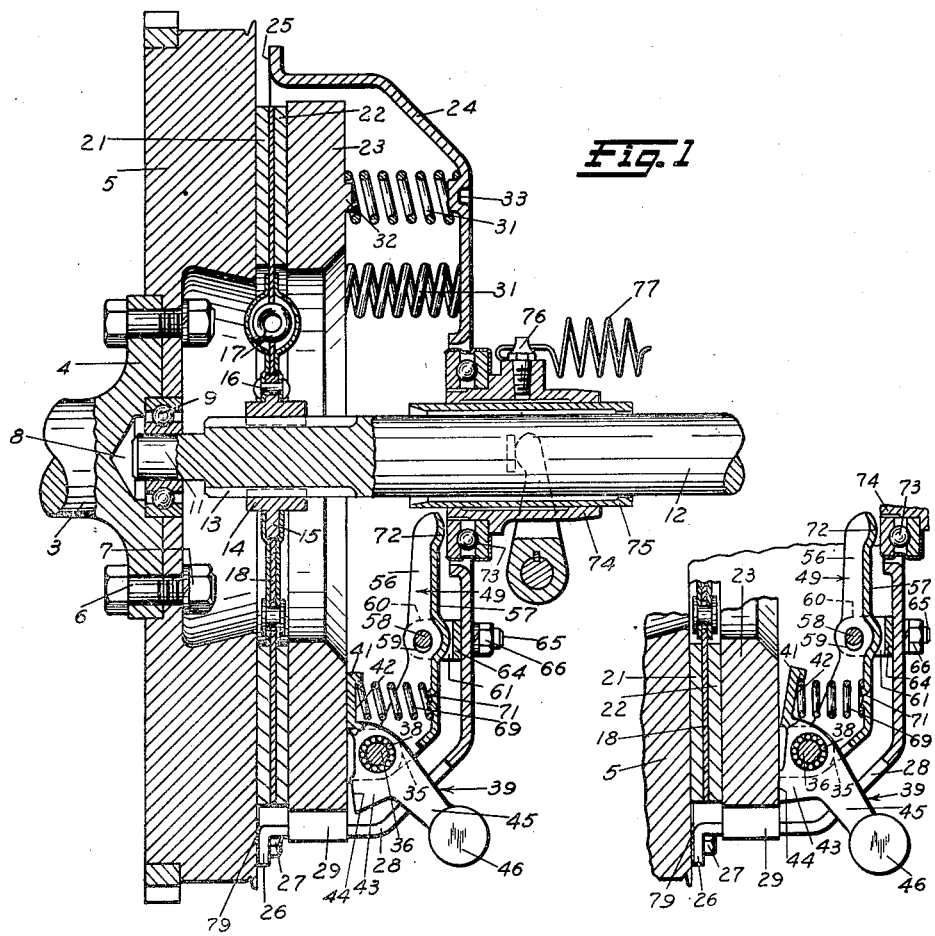
Fig.1
Fig.2
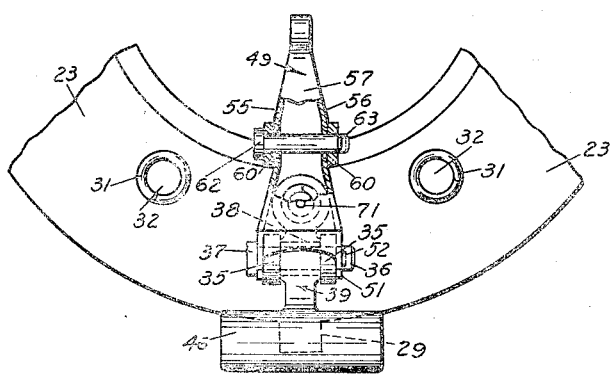
Fig.3
Inventor
Roy D. Bateman
Strauch & Hoffman
Attorneys March 26, 1940.  R. D. BATEMAN  2,195,354
SEMIAUTOMATIC CLUTCH
Filed March 27, 1935  2 Sheets-Sheet 2
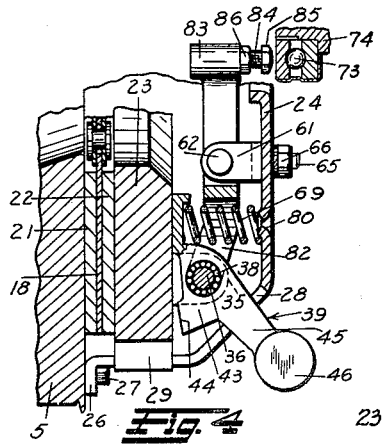
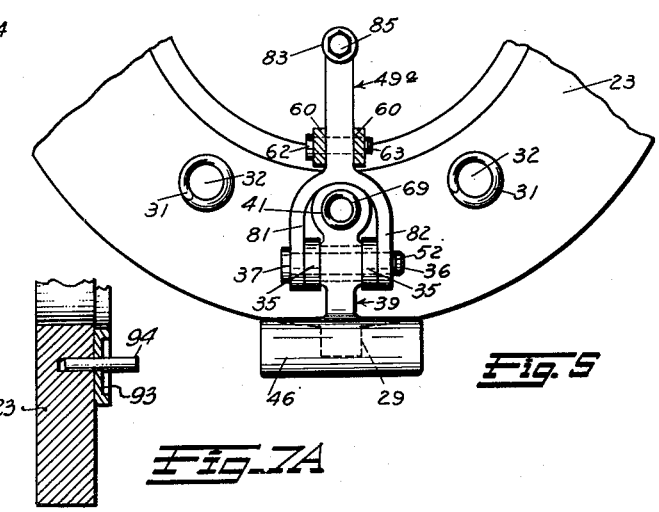
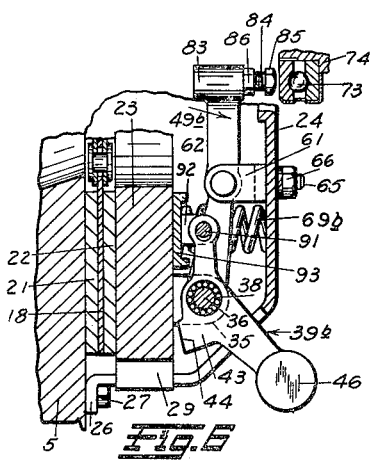
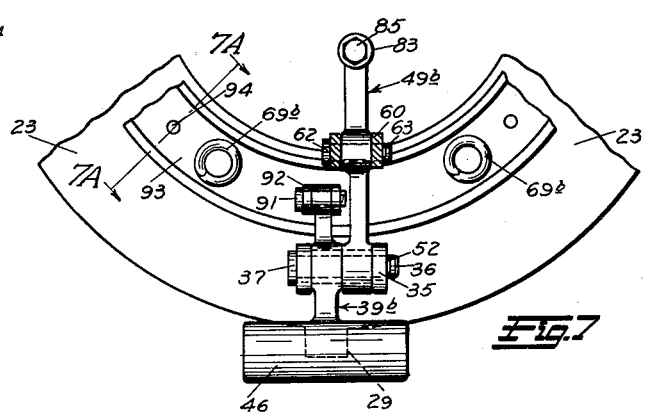
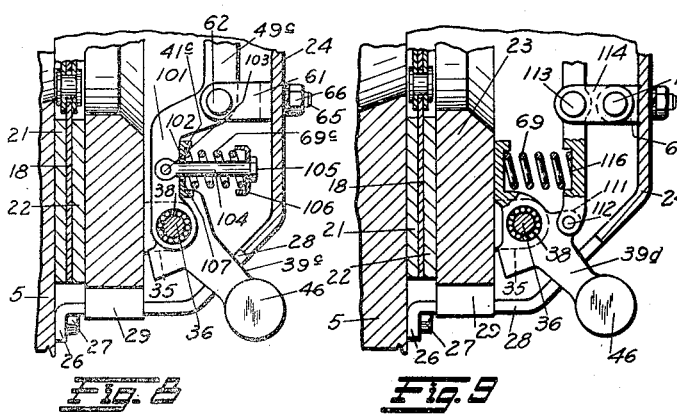
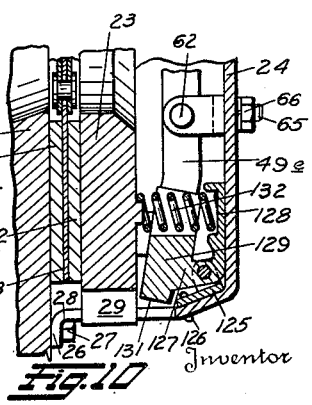
Inventor
Roy D. Bateman
Strauch & Hoffman
Attorneys Patented Mar. 26, 1940

2,195,354

UNITED STATES PATENT OFFICE 2,195,354

SEMIAUTOMATIC CLUTCH

Roy D. Bateman, Virginia Highlands, Va., assignor to Automatic Drive and Transmission Company, Ossining, N. Y., a corporation of New Jersey Application March 27, 1935, Serial No. 13,326

13 Claims. (Cl. 192—105)

This invention relates to clutches, and it is more particularly concerned with spring engaged clutches having a centrifugally operable mechanism for augmenting the clutch pressures at speeds above engine idling speed.

There has recently appeared on the market an automotive clutch which is of conventional spring engaged design, except for the provision of centrifugal masses on the throwout levers. The centrifugal masses or weights are operable to exert clutch engaging forces upon the throwout levers when the engine is accelerated and thereby augment the clutch engaging action of the clutch springs whereby lighter clutch springs may be used. Although the broad objective sought to be achieved by these clutches was in fact attained, i. e., the reduction of clutch throwout pedal pressure at idling speeds, it has been found that in other respects such clutches possess at least two distinctly objectionable operating features. One serious fault of such prior clutches resides in the fact that the requisite declutching effort increases rapidly with increases in engine speed, with the result that if it is attempted to declutch at even moderately high engine speed, for gear shifting or like purposes, the clutch pedal pressure is excessive.

Another defect inherent in such prior clutches resides in the fact that the centrifugal masses act directly through the throwout levers, with the result that when the engine is accelerated the weights act solidly against the clutch plates and often cause the latter to "chatter" and "grab" and pick up the load in a jerky manner.
It is accordingly a primary object of my invention to provide a spring-engaged clutch with a throwout mechanism which will respond to engine speed to augment the clutch engaging action of the clutch springs, and yet which will not materially increase the required declutching pedal pressure, even at high engine speeds.

It is a further important object of my invention to equip spring-engaged clutches with a throwout mechanism that will respond to higher engine speeds to smoothly augment the clutch engaging action of the clutch springs with a yielding secondary engaging pressure.

It is a further object of this invention to provide spring-engaged clutches with novel throwout mechanisms which are operable to augment the engaging action of the clutch springs at engine speeds in excess of engine idling speed.

Further objects of this invention will become apparent as the specification thereof proceeds in connection with the annexed drawings, and from the appended claims.

In the drawings:

Figure 1 is a longitudinal sectional view of a clutch showing one form of lever assembly of the present invention applied thereto, the parts being shown in the positions they assume when the engine is idling or is stopped.

Figure 2 is a fragmental sectional view of the lever assembly shown in Figure 1, but it illustrates the parts as they appear when the engine has been accelerated to a predetermined "centrifugal" engaging speed.

Figure 3 is a fragmental view, with parts in section, of the device shown in Figure 1, as it appears when viewed from the right-hand side of that figure, and with the cover removed.

Figure 4 is a fragmental sectional view of a modified form of lever assembly also forming part of my invention.

Figure 5 is a view, with parts in section, of the construction shown in Figure 4, illustrating the parts as they appear when viewed from the right-hand side of that figure, with the clutch cover removed.

Figures 6 and 7 are similar to Figures 4 and 5, but illustrate another modified form of my invention, and Figure 7A is a fragmental sectional view taken substantially on the line 7A—7A of Figure 7, looking in the direction of the arrows.

Figures 8, 9, and 10 are fragmental sectional views of the clutch shown in Figure 1, but illustrate modified forms of plate actuating assemblies installed therein, also forming part of my invention.

Referring to the drawings, wherein like reference characters have been employed to designate like parts wherever they occur, and with particular reference to Figures 1, 2 and 3, a driving shaft 3 is adapted to have rotational efforts thereto applied by a suitable prime mover in any desired manner, and in the present instance it is shown as constituting the crank-shaft of an internal combustion engine. The flanged end 4 of shaft 3 is secured to a flywheel 5 in any suitable manner as for example by means of bolts 6 which extend through aligned apertures in the flange and flywheel and have nuts 7 turned thereon.

Shaft 3 is further provided with a bore 8 which accommodates a pilot bearing assembly 9 adapted to support the reduced end 11 of a driven shaft 12. The rear end of shaft 12 is journaled in any suitable manner (not shown). The portion of shaft 12 adjacent reduced end 11 is provided with splines 13 which accommodate a splined hub 14 having a flange 15 to which is secured, by means of rivets 16 or the like, a vibration dampener 17.

The vibration dampener 17 is designed to effect a smooth and resilient driving coupling between hub 15 and a driven disc 18 secured to the vibration dampener and disposed parallel to flywheel 5. If desired, however, the vibration dampener may be omitted, and disc 18 secured directly to hub 15. Secured to driven disc 18 near its periphery are friction facings 21 and 22 formed from any material having the proper and requisite gripping characteristics. Facing 21 is designed to cooperate with the flat driving face of the flywheel and is frictionally driven thereby. Facing 22 is designated to cooperate with a plate 23 which will be hereinafter termed the driving plate and which is adapted to engage and clamp the driven member between it and the flat face of the flywheel. Driving plate 23 is of substantial thickness in order that it may be possessed of sufficient rigidity to prevent undesirable distortion or warpage under the pressures and temperatures to which it is subjected during operation.

A cover member 24, whose periphery is spaced from flywheel 5, as indicated at 25, is provided with offset portions 26 adapted to be secured to the face of flywheel 5 in any suitable manner as for example by means of cap screws 27 or the like. Cover 24 is provided with radial slots 28 which are preferably three in number and function in a manner to be presently set forth.

Driving plate 23 is provided with preferably three integral lugs 29 which extend through slots 28 in the cover member and serve to key the driving plate for rotation with the cover member and flywheel while at the same time permitting axial reciprocation of the driving plate with respect to the cover member and flywheel.

Driving plate 23 is at all times urged toward the flywheel by means of a series of compression springs 31 which are retained in position with respect to plate 23 by means of lugs 32 formed thereon. Springs 31 react against the cover 24 and are centered thereon by means of pressed out portions 33 formed in the cover member.

From the structure thus far described it will be readily appreciated that rotation of crankshaft 3 will be effective to produce synchronous rotation of flywheel 5 and cover 24 through the medium of bolts 6 and 27 respectively, and will also effect rotation of driving plate 23 through the medium of lugs 29 which cooperate with slots 28 formed in the cover. Under the influence of springs 31 plate 23, while rotating in the manner just described, will normally tend to clamp driven disc 18 between itself and the flywheel to thereby effect a power transmitting coupling between shafts 3 and 12.

Disposed symmetrically in pairs about the periphery of driving plate 23, and preferably formed integrally therewith, is a series of lugs 35, each pair of which may be disposed upon a substantially common radius with one of the lugs 29 formed on the driving plate.

As the structures associated with each pair of lugs 35 are identical, only one such structure will be described in detail. Extending between each pair of lugs 35 and received in suitable apertures in the lugs is a pin 36 provided with a head 37. Journaled upon pin 36 between lugs 35, preferably by means of needle bearings 38 or the like, is a lever member 39 which extends radially inward to form a disc-like toe portion 41 provided with a central depression 42 for a purpose presently to appear.

Member 39 is further provided with an integral heel section 43 having a stop face 44, and a leg section 45 the outer end of which expands into a preferably integral centrifugal head or weight portion 46, which is disposed externally of cover member 24. As clearly seen in Figure 1, leg 45 of member 39 extends through slot 28 in the cover member 24 and upon rotation of lever member 39 about pin 36 the leg 45 may freely reciprocate within slot 28 as the latter is radially disposed and is larger than the lever.

Also mounted upon pin 36 is a throwout lever 49, one end of which is provided with bifurcations 51 which are disposed adjacent the exterior faces of lugs 35 and are provided with apertures for receiving pin 36 which is retained in assembled disposition by means of its head 37 at one end and a cotter pin 52 received in the shank of the pin at its other end.

As seen in the drawings, throwout lever 49 is substantially trough-shaped, having legs 55 and 56 and a bridge section 57. Near its mid-portion throwout lever 49 is designed to be pivotally supported upon the inside of cover 24 by means of a pin 58 which passes through elongated slots 59 in the sides of the lever and is received in aligned apertures formed in legs 60 of a bracket member 61. Pin 58 is retained in assembled relation by means of a head 62 therein formed at one end and a cotter pin 63 received in the shank of the pin at its other end.

Each bracket 61 is of generally U-shape and it is provided at its base portion with an integral stud bolt 65 or the like which extends through an aperture in cover 24 and is retained in position by means of a nut 66 or the like.

Disposed between toe 41 of member 39 and bridge 57 of the throwout lever is a compression spring 69, one end of which acts against the bottom of depression 42 in the toe of member 39 and is thereby centered, and the other end of which is centered to react against the bridge of the throwout lever by means of pressed out portions 71 formed therein.

The inner end of the throwout lever is rounded to provide a contact face 72 for cooperation with a throwout bearing assembly denoted generally at 73 and which may assume the form of any conventional throwout bearing structure well known in the art. Bearing assembly 73 may preferably be supported upon a collar 74 designed for axial reciprocation upon a sleeve 75 and provided with a grease fitting 76 or the like for lubrication. A tension spring 77 normally tends to retract the bearing assembly from contact with face 72 of the throwout lever. As previously indicated, the weight lever and throwout lever assemblies are preferably three in number, although a greater number may be used if desired.

Assuming the crank-shaft to be stationary or rotating at substantially idling speed, the parts of the mechanism just described will assume the positions illustrated in Figure 1 of the drawings. Under such conditions it will be appreciated that compression springs 69, reacting against the toes of lever members 39 will be effective to retain members 39 in their illustrated positions and to prevent centrifugal weights 46 from effecting clockwise rotation of members 39 under the influence of centrifugal forces induced at idling speed or under the action of gravity when stationary.

Under the conditions above assumed, the action of compression springs 31 directly against driving plate 23 and the indirect action of compression springs 69 against the driving plate through the intermediary of toes 41 of lever members 39, are effective to urge the driving plate axially toward the flywheel and to clamp the driven plate therebetween. This results in a partial or light engagement pressure upon the clutch plates so long as the prime mover is stationary or is operating at or below idling speed.

Should it be desired under such conditions to disengage the clutch, it is only necessary to reciprocate throwout bearing assembly 73 to the left of the position seen in Figure 1, to thereby institute counterclockwise rotation of throwout lever 49 until pin 36 accommodated in the end thereof is sufficiently withdrawn together with lugs 35 and driving plate 23 from the flywheel to disengage the driven plate and allow independent rotation thereof. This operation is brought about in an automotive vehicle by depressing the clutch pedal. In executing this operation it is necessary to overcome only the force exerted by springs 31 and 69, and as the springs are designed to exert clutch engaging pressure under these conditions which is only 60 to 70% of the clutch engaging pressure when the weights move out into contact with their stops, it is apparent that only a small pedal pressure need be employed to disengage the clutch when the engine is idling or stationary. This is a distinct contrast to the conventional spring-engaged clutches heretofore employed and which of necessity must exert a constant high engaging pressure at all times irrespective of engine speed.

If the rotational speed of the prime mover and crankshaft be increased substantially above idling speed the partial or semi-engagement of the clutch just described (and shown in Figure 1) will be smoothly built up and evenly translated into a maximum final engagement pressure (shown in Figure 2) in the following manner.

As the rotational speed of the clutch is increased, centrifugal weights 46, acting under the influence of centrifugal force will tend to move radially outward and in so doing will be constrained to rotate in a clockwise direction about pins 36. Such rotation of the centrifugal weights is, however, opposed by the reaction of springs 69, and as the angular speed of the clutch is gradually accelerated the centrifugal force exerted by weights 46 will develop sufficient torque about pins 36 to progressively overcome the opposing forces, exerted by springs 69. Members 39 will then rotate in a clockwise direction until stop faces 44 formed on heels 43 of members 39 are brought into abutting relationship with the face of driving plate 23. At this time further rotation of lever members 39 about pins 36 is positively prevented and weights 46, levers 39 and driving plate 23 will rotate together as a unitary mass. The disposition of the parts of the mechanism under the conditions just described is illustrated in Figure 2 of the drawings.

It will be appreciated that when levers 39 pivot about pins 36 under the action of the centrifugal weights in the manner just described, springs 69 will be gradually compressed and the axial reaction of the springs against the toes of levers 39 will be progressively increased until it reaches a maximum when weights 46 attain their extreme outward radial dispositions and stops 44 of the levers 39 are brought into contact with the driving plate. It is moreover apparent that continuously outward rocking of levers 39, the reaction of springs 69 is translated from the toes of the levers 39 through pins 36 and lugs 35 to the driving plate, and thus at all times during centrifugal actuation of weights 46 and levers 39 the effective reaction of springs 69 is directed against or applied to the driving plate. In this manner as the clutch is accelerated from idling speed to "positive" or high speed, with ensuing rotation of levers 39 and compression of spring 69, the force exerted by springs 69 upon driving plate 23 as just set forth is increased uniformly to a maximum and the driving plate 23 is urged toward the flywheel thus causing the driven member to be more securely gripped between the driving plate and flywheel and effecting a uniform build up of driving pressure over the frictional facings of the driven plate to a maximum determined when stops 43 of the centrifugal levers 39 are brought into abutting relation with the driving plate.

Any further increase in the angular speed of the clutch assembly is ineffective to cause further centrifugal actuation of the weights 46 and levers 39 and is consequently ineffective to further compress springs 69 and increase the driving pressure imposed upon the facings of the driven member. This is brought about by reason of stops 43 on the centrifugal levers 39 contacting the driving plate. When this occurs, centrifugal levers 39 and the driving plate rotate together as a unitary mass, the pins 36 and stop heels 43 which effect contact between the centrifugal levers and driving plate being effective to prevent relative movement therebetween and being operatively effective to lock the centrifugal levers and driving plate together in unitary relation. The maximum driving pressure which may be imposed upon the driven disc is thus automatically limited to a predetermined pressure, and may not be exceeded regardless of the degree to which the rotational speed of the clutch assembly is increased.

It will be observed that if the clutch is fully engaged in the manner just described, and it is desired to declutch, disengagement of the present clutch structure is not effected directly against the action developed by the centrifugal weights 46, but is effected against the direct action of springs 69 which have been stressed to only a predetermined degree by the centrifugal action of weights 46. Thus it is apparent that in performing the disengaging operation it is necessary, after overcoming the constant action of springs 31 to overcome only the action of springs 69 which is induced indirectly by the centrifugal action of weights 46. As the maximum force exerted by springs 69 is automatically limited in the manner previously described it will be appreciated that the maximum force which it is necessary to overcome in retracting the driving plate from the flywheel to effect declutching is also automatically limited regardless of rotative speed of the clutch assembly.

When the declutching operation is effected, throwout assembly 73 moves to the left and takes up the small clearance between it and the throwout levers. Further movement of the throwout member (Figure 2) effects counterclockwise rocking movement of levers 49, and this in turn effects disengaging movement of plate 23 to the right. Movement of plate 23 in the manner just described is opposed by the direct action of springs 31 and by the compound action of springs 69 as the latter are compressed from both ends under these conditions.

The weights and springs are so designed that full engagement pressure will be obtained before the engine attains a speed corresponding to its "peak torque" speed, and as gear shifting is often performed at speeds below this speed, it is apparent that declutching may sometimes be performed when the weights are disposed in an intermediate position.

From the description thus far made of the preferred form of my invention, it will be seen that the centrifugal force and torque developed by action of weights 46 during rotation of the clutch assembly is not directly applied to the driving plate, but is directly effective only to cause compression of springs 69 with progressively varying reaction thereof against the toes of levers 39 and transmission of such reaction by means of pins 36 and lugs 35 to the driving plate.

By virtue of the resilient and yielding nature of springs 69 a uniform build up in compression thereof is ensured regardless of irregularities in the action of centrifugal weights 46, and by reason of the indirect reaction of springs 69 against the driving plate a similar uniform build up of driving pressure as applied to the driven plate is ensured. Thus it is seen that compression springs 69 serve to supply a smooth and yielding engagement force to the driving plate as distinguished from the non-yielding forces exerted by a weight assembly which is directly connected to the plates, and which would cause the plates to chatter in response to pulsations in the centrifugal action of the weights.

Since springs 69 act upon levers 39 and 49 at all times and urge toes 41 of the centrifugal evers into contact with the driving plate at all times unless overcome by the centrifugal action of weights 46, it will be appreciated that the springs serve to prevent fluttering or rattling of the centrifugal levers or the throwout levers and to firmly retain the centrifugal levers in the position illustrated in Figure 1 unless overcome by the action of the centrifugal weights.

As driving plate 23 and pins 36 undergo no appreciable axial displacement during build up of driving pressure under the action of the centrifugal weights, it is clear that throwout levers 49 will undergo no appreciable rotation about their pivots 58 and in consequence the inner ends of the throwout levers, which are adapted for cooperation with the throwout bearing assembly, will suffer no substantial axial displacement.

When the clutch has been in service for some time and facings 21 and 22 have worn thin, it is desirable to compensate for the loss of spring pressure that is attendant upon such fact. In the present instance I have illustrated shims 79 disposed between cover 24 and the flywheel which may be removed to bring the clutch assembly closer to the flywheel and thereby restore the proper spring pressure.

Several alternate forms of my invention are illustrated in Figures 4 through 10 of the drawings, and in these figures parts of similar construction are denoted by like reference characters and parts of only slightly modified construction over those shown in Figure 1 are denoted by like reference indices with addition of a suitable subscript for purposes of differentiation.

Referring now to Figures 4 and 5 of the drawings, a modified form of my invention is illustrated wherein springs 69 are designed to act directly against cover 24 instead of acting against the throwout levers as indicated in Figure 1. Pressed out portions 80 are provided in cover 24 for centering springs 69, which at their other ends react against the toes of the centrifugal levers in the manner described in connection with the preferred form of my invention. In this form of my invention throwout lever 49a is forked to provide dual arms 81 and 82 which correspond to bifurcations 51 of the preferred form of my invention and serve to pivotally mount the throwout levers 49a on pins 36. The space defined by the forked arms of lever 49a is designed to accommodate spring 69 and allow the same to extend from the cover 24 past levers 49a to the toes of the centrifugal levers.

The inner end of each throw out lever 49a is expanded into a boss portion 83 into which is threaded an adjustable throwout bolt 84 provided with a head 85 and which is locked in adjusted relation with respect to boss 83 by means of a locknut 86 or the like. Head 85 of each throwout lever bolt is adapted to cooperate with the throwout bearing assembly in the manner described in connection with the first form of my invention for effecting clutch engagement and disengagement. By means of the structure just described, each throwout bolt 84 may be adjusted with respect to its throwout lever 49a to insure proper cooperation between the throwout bearing assembly and the throwout levers regardless of any inadvertent misalignment of these parts which may be occasioned through manufacturing inaccuracies or wear of the parts in service.

Should the facings of the driven plate become appreciably worn in service, with resulting displacement of the outer ends of the throwout levers to the left, as seen in Figure 4, and consequent displacement of the inner ends of the throwout levers to the right as viewed in this figure, it is necessary only to loosen locknuts 86, adjust throwout bolts 84 until heads 85 thereof are disposed in proper relation to the throwout bearing assembly to provide proper clearance, and return the locknuts 86 to locking position. In this manner misalignment of the throwout assembly may be readily compensated under any condition of service.

From the description of the modified embodiment of my invention as shown in Figure 4 it will be seen that a clutch assembly of maximum compactness and efficiency is provided. By virtue of allowing springs 69 to act directly against the cover 24 instead of against the throwout levers, cover 24 may be disposed in relatively closer proximity to the driving plate. By this construction the overall axial dimension of the assembled clutch structure may be reduced over that shown in Figure 1, and although the springs do not serve the additional function of anti-rattle springs, it is to be understood that if desired anti-rattle springs may be associated with the levers.

It is therefore apparent that in this form of my invention springs 69 serve both the function of usual pressure springs (when the clutch is engaged at low speeds) and centrifugal force transmitting springs (when the engine is accelerated with the clutch engaged). Although springs 69 may be made stiff enough to perform both of these functions, it is to be understood that if desired the toes of the levers may be provided with two or more pockets and a plurality of springs associated with each lever or separate drive springs may be provided as in the device shown in Figures 1, 2 and 3.

Referring now to Figures 6 and 7 of the drawings, a further modified embodiment of my invention is illustrated wherein springs 69b act against a surface which is at all times designed to be normal to the helical axis of the springs. As seen in the drawings, the toe of each centrifugal lever 39b is designed to accommodate a pin 91 upon which are journalled, adjacent the sides of the toe, dual lugs 92 which are formed integrally with or secured to, in any desired manner, an annular reaction member 93 which is provided with dowel pins 94 or the like designed to reciprocate within aligned apertures (not shown) in the driving plate. The dowel pins allow axial displacement of the reaction member 93 with respect to the driving plate, but at all times maintain the reaction plate concentric with respect to the driving plate.

In order to insure that levers 39b may freely rock about pins 36 without interference from arms 92, the openings in the toes of the levers are of slightly elongated form. By such construction any rotation of the centrifugal levers about their pivot pins 36 is effective to cause axial displacement of reaction member 93.

As the reaction plate 93 is at all times substantially normal to the helical axis of springs 69b, the springs under all conditions act and react against surfaces substantially normal thereto and are thus under no circumstances subjected to distorting forces.

As indicated in Figure 7, the throwout levers 49b are disposed to one side of the centrifugal levers instead of being disposed upon common radii therewith, as in the manner shown in Figure 1. Furthermore, springs 31 have been eliminated in the present modification of my invention, and springs 69b have been increased proportionately in strength and disposed about the reaction plate in pairs each of which is symmetrically disposed with respect to a throwout and centrifugal lever assembly instead of being disposed upon common radii therewith. If desired, however, additional springs may be employed to act directly against plate 23 and the clutch lever.

With reference now to Figure 8 of the drawings, a further modified embodiment of my invention is illustrated wherein the toes of the centrifugal levers are offset and designed to bear directly against the throwout levers instead of against the driving plate as shown in the preferred form of my invention. In this construction a plurality of direct acting springs 31 (not shown) are disposed between plate 23 and the cover, as in Figure 1, but each throwout lever 49c below its bracket 61 is offset as indicated at 101 to provide a seat 102. Pivotally secured to offset 101 by means of a pin 103 is a bolt member 104 which extends normally away from seat 102 and is provided at its other extremity with a head 105.

A cup member 106 is disposed concentrically upon core member 104 adjacent head 105 and is urged into contact with head 105 by the action of a spring 69c coiled about bolt 104. Spring 69c acts against offset toe 41c of the centrifugal lever. The toe of each centrifugal lever, which is provided with an enlarged aperture 107 for accommodating bolt 104, is offset from the centrifugal lever and overlies the throwout lever and is adapted to rest against seat 102 of the latter when the weight 46 is in retracted position, as seen in Figure 8.

The present modification of my invention operates in the following manner. With the clutch engaged under the influence of springs 31, as weights 46 swing outwardly under the influence of centrifugal force in response to acceleration of the engine, springs 69c are compressed between the stationary cup members 106 and the moving toes 41c of the centrifugal levers. The reaction of springs 69c against the toes of the centrifugal levers is transmitted, by means of pins 36 and lugs 35, to the driving plate and in this manner rotation of the centrifugal levers is effective to build up pressure in springs 69c and this in turn is effective to increase the driving pressure exerted upon the facings of the driven member. This embodiment of my invention is thus seen to operate in substantially the same manner as those previously described.

Referring now to Figure 9 of the drawings, a further modified embodiment of my invention is illustrated wherein the outer ends of the throwout levers, instead of being pivotally mounted together with the centrifugal levers upon common pins, are pivotally mounted upon individual pins accommodated in the centrifugal levers.

In this embodiment of my invention each centrifugal lever 39d is provided with a lug 111 in which is accommodated a pin 112 upon which is pivotally mounted the outer extremity of the throwout lever. Each throwout lever is further pivoted, intermediate of its inner and outer extremities, by means of a pin 113, upon a link member 114, the other end of which is secured by means of a pin 115 to a bracket member 61d mounted upon the clutch cover. Each spring 69 is disposed between the toe of a centrifugal lever and a seat 116 in the throwout lever, and operates in a manner similar to those previously described.

The operation of this form of my invention is identical with that of the preferred form excepting that as the centrifugal weights swing outwardly in response to acceleration of the engine, the throwout levers will be displaced radially outward by virtue of the fact that pins 112 under such condition will undergo a slight radial displacement. Such displacement of the throwout levers is, however, provided for as the throwout levers are linked to the cover member and may therefore undergo displacement radially with respect thereto. This form of this invention is similar to that shown in Figure 4, in that springs 69 function both as pressure springs and centrifugal force-transmitting springs, but it is to be understood that if desired a plurality of pressure springs 31 may be mounted between plate 23 and cover 24, as shown in Figure 1, without departing from the spirit of my invention.

In Figure 10 a further modified form of centrifugal unit is shown and with continued reference to this figure, the throwout assemblies are separate from the centrifugal assemblies. One of the throwout levers 49e is seen behind the centrifugal structure and the throwout assembly is connected to plate 23 and functions to withdraw plate 23 for declutching purposes in the manner described in connection with the previously described forms of the invention.

Secured to cover 24, are a plurality of brackets 125. Brackets 125 may be secured to cover 24 in any suitable manner as for instance by means of rivets 126, and each bracket pivotally supports a centrifugal lever 127 which is provided with at least one spring pocket 128, and a weight or mass portion 129 having a stop face 131. It is observed that weight portion 129 of lever 127 is substantially U-shape in cross-section in order that it may rock without interference from spring 132, and it is to be understood that if two springs are used in each assembly, instead of the single spring shown, the weighted portion of the lever may either be disposed between them, or the springs be placed close together and a U-shaped weight portion employed. A compression spring 132 bears against the bottom of each pocket 128 and acts against plate 23.

Springs 132 hold the rear faces of levers 127 in firm engagement with the inner face of cover 24 when the engine is stopped or is operating at low speed. Springs 132, under the condition just described, therefore act against plate 23 and urge the clutch into engaged condition in the same manner as the springs of conventional clutches. When the engine is accelerated, however, levers 127 rock anti-clockwise (Figure 10) and increasingly compress springs 132 and thereby smoothly increase the plate pressure. When levers 127 have rocked outwardly a predetermined extent, stop face 131 thereof engages the inner surface of cover 24 adjacent slots 28 and arrest further outward movement of the levers and thereby limit the pressure built up in springs 132. While I have shown the mass portion 129 of levers 127 as being disposed within the cover, it is to be understood that if desired, levers 127 may be designed to extend through slots 28 and be provided with mass portions similar to those shown in the previously described devices. In such case the portions of levers 127 intermediate the pivot and weight portions could be provided with stop faces to engage cover 24 adjacent slots 28.

It should be observed that in the forms of the invention illustrated in Figures 1, 2, 3, 4, 5, 9 and 10, the springs acting against the weight levers maintain them in firm contact with their pivots at all times, and therefore should wear develop at the pivots while the clutch is in service, the levers are nevertheless prevented from rattling.

Vacuum actuated clutch operators have appeared in the automotive industry in the last few years, and although they have gone into limited use, they possess the serious disadvantage—especially when they are slightly out of adjustment, or are handled carelessly,—of engaging the clutch too suddenly, with the result that the vehicle is not ony started in a jerky manner, but also the engine is often stalled. In an effort to remedy this condition, inertia-controlled retarding devices were developed for checking the movement of the clutch parts just prior to engagement, but these devices have proven to be both complicated and ineffectual. The major reason why these devices have failed is because they have applied full engaging pressure to the clutch plates, and it is therefore apparent that if the clutches shown in the present application are employed with the vacuum operators of the prior art, a satisfactorily operating organization may be attained by reason of the fact that when the clutches of my invention are engaged at fairly low speed, the plate pressure is considerably lower than in the comparable conventional spring controlled clutch which has been used with the vacuum operators. For instance, if the conventional clutch has a total spring pressure of twelve hundred pounds, my clutch, when constructed to have a similar capacity, will only have a total spring pressure of seven to eight hundred pounds when the engine is operating at low speeds, but it will have a pressure of twelve hundred pounds when the operating speed of the centrifugal weights is attained.

Therefore, with my clutch equipped with a vacuum operator, and the engine is improperly accelerated, so as to cause the vacuum operator to let the clutch in rapidly, (i. e. to allow the inner ends of the throwout levers to move rapidly to the right, Figure 1), it is true that the plates are suddenly brought into engagement by springs 31, but as the total pressure of eight hundred pounds is ineffective to establish a positive drive, the clutch slips and smoothly takes up the load. As the engine is further accelerated, the centrifugal levers rock outwardly and build up the clutch pressure to say twelve hundred pounds, and establish a positive drive. I desire it to be understood that the combination of my clutches with a vacuum or like power clutch operator is disclosed herein and is part of the present invention. This combination has not been shown in the drawings, however, as vacuum operators per se are well known in the art, and no claim is made thereto. For instance, vacuum operators are shown in the patent to Belcia No. 1,470,272, and Hill No. 1,964,693, and as it is apparent how these operators could be connected to the throwout mechanisms of my clutches, I have not illustrated them herein. The vacuum operators used with my clutches preferably shall be adjusted to at least initially bring the plates into engagement before the engine can be accelerated to a speed sufficiently high to allow the centrifugal mechanism to materially augment or increase the initial spring pressure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch, a rotatable supporting structure, a driving plate connected to said structure for synchronous rotation therewith and operable to undergo axial clutch engaging and disengaging movements with respect thereto, a driven member cooperating with said driving plate, a centrifugally operable lever pivotally connected to said driving plate and operable to rock outwardly in response to centrifugal force, a throwout lever pivotally connected to said supporting structure and to said driving plate and operable to effect disengaging movement of the latter when it is rocked in one direction, and resilient means acting upon said centrifugally operable lever and tending at all times to effect engaging movement of said driving plate and urging said lever toward retracted position against the action of centrifugal force, said resilient means being sufficiently strong to cause said driving plate to transmit considerable driving torque to said driven member, said resilient means being operable to react, against said throwout lever.

2. In a clutch, a flywheel, a cover assembly, a driving plate disposed within said cover and adapted to undergo clutch engaging and disengaging movements with respect thereto, a centrifugally operable lever element pivotally connected to said driving plate and having at least one spring seat portion adapted to lie in engagement with said driving plate when the lever is disposed in retracted position, said lever being pivotally connected to said driving plate in such manner that when the lever rocks outwardly in response to centrifugal force the spring seat portion thereof will undergo substantially axial movement, and at least one compression spring acting against the spring seat portion of said lever and reacting against said cover to thereby constantly urge the spring seat portion of said lever toward said driving plate and tend to effect engaging movement of the latter.

3. The clutch construction described in claim 2, wherein said lever is provided with a stop portion which is operable to contact said driving plate when the latter attains a predetermined speed, to thereby limit the pressure built up in said spring to a predetermined value.

4. The clutch construction described in claim 2, together with a throwout lever pivotally connected to said driving plate for effecting disengaging movements thereof against the action of said spring.

5. The clutch construction described in claim 2, wherein said spring seat portion of said lever comprises a ring-like member which is adapted to bear against said driving plate under the influence of said spring and which is pivotally connected to said lever.

6. In a clutch, a rotatable supporting structure, a driving plate connected to said structure for synchronous rotation therewith and operable to undergo axial clutch engaging and disengaging movements with respect thereto, a centrifugally operable lever pivotally connected to said driving plate and operable to rock outwardly in response to centrifugal force, a throwout member pivotally connected to said structure and to said driving plate and operable to effect disengaging movement of said driving plate when it is rocked in one direction, yieldable means interconnecting said lever and member and tending to effect engaging movement of said driving plate when said lever rocks outwardly, said yieldable means permitting said throwout member to effect disengaging movement of said driving plate irrespective of the position assumed by said lever under the influence of centrifugal force, said yieldable means also tending to effect engaging movement of said driving plate when said lever is inoperative.

7. The clutch construction described in claim 6, wherein said yieldable means comprises spring means which constantly tends to urge cooperating parts of said lever and throwout member away from each other.

8. The clutch construction described in claim 6, wherein said lever and throwout member are journaled on a common pivot upon said driving plate.

9. The clutch construction described in claim 6, wherein said yieldable means comprises compression spring means acting against said lever and reacting against said throwout member and constantly tending to effect engaging movement of said driving plate.

10. The clutch construction described in claim 6, together with means for arresting said lever after it has rocked outwardly a predetermined distance, to thereby limit the stress built up in said yieldable means.

11. The clutch construction described in claim 6, wherein said yieldable means comprises a compression spring acting and reacting directly against spring seats provided upon said lever and throwout member respectively.

12. In a clutch, a flywheel and cover assembly, a driving plate disposed within said cover and mounted for axial engaging and disengaging movements toward and away from said flywheel, said driving plate having pivot means thereon adjacent said cover, said cover having fulcrum means adjacent said pivot means, and a lever assembly comprising a lever pivotally interconnecting said pivot means and said fulcrum means and operable to positively effect disengaging movement of said driving plate when it is rocked in one direction, and operable to positively effect engaging movement of said driving plate when it is rocked in the opposite direction, said lever assembly also including a centrifugally operable part capable of undergoing limited movement independently of said lever tending to cause clutch engagement, and resilient means constantly tending to effect engaging movement of said driving plate, said lever assembly comprising at least two levers interconnected by resilient means.

13. In a clutch, a flywheel and cover assembly, a driving plate disposed within said cover and mounted for axial engaging and disengaging movements toward and away from said flywheel, said driving plate having pivot means thereon adjacent said cover, said cover having fulcrum means adjacent said pivot means, and a lever assembly comprising a lever pivotally interconnecting said pivot means and said fulcrum means and operable to positively effect disengaging movement of said driving plate when it is rocked in one direction, and operable to positively effect engaging movement of said driving plate when it is rocked in the opposite direction, said lever assembly also including a centrifugally operable part capable of undergoing limited movement independently of said lever tending to cause clutch engagement, and resilient means constantly tending to effect engaging movement of said driving plate, said lever assembly comprising at least two levers interconnected by resilient means which constantly tend to effect engaging movement of said driving plate.

ROY D. BATEMAN.